United States Patent Office 2,853,459
Patented Sept. 23, 1958

2,853,459

AQUEOUS COMPOSITION CONTAINING OIL MODIFIED ALKYD RESIN AND LOWER ALKANOL MODIFIED MELAMINE-ALDEHYDE RESIN AND METHOD OF PREPARING

Roger M. Christenson, Richland Township, and Donald P. Hart, Allison Park, Pa., assignors to Pittsburgh Plate Glass Company No Drawing. Application February 24, 1955
Serial No. 490,410

7 Claims. (Cl. 260—21)

This invention relates to coating compositions capable of forming hard, glossy, flexible films, and pertains more particularly to water dispersed baking enamels formed essentially from resinous components including a water dispersible alkyd resin and a triazine-aldehyde resin.

In recent years there has been an ever increasing trend toward the use of aqueous vehicles in coating compositions. The remarkable growth in the use of these water based materials has been due primarily to several factors: (a) the substitution of water for organic solvents greatly reduces the cost of the coating material and eliminates the need for costly solvent recovery equipment, (b) the use of water as a vehicle eliminates the flammability hazard which the highly volatile solvents present, and (c) the sometimes disagreeable odors of the solvents utilized are eliminated.

Heretofore, however, it has not been possible to produce a useful baking enamel having an aqueous vehicle. Previous attempts to produce such a material resulted in discontinuous films, poor adhesion, poor flexibility, lack of film strength and other serious disadvantages. Consequently, the use of aqueous vehicles in coating compositions has been limited to air drying compositions such as are utilized on the interior surfaces of homes, offices, and factory buildings. Such compositions ordinarily contain as the sole resinous component a butadiene-styrene polymer latex.

It now have been discovered that useful water dispersed coating compositions can be formed by utilizing as resinous components thereof, a water dispersible alkyd resin and a water soluble triazine-aldehyde resin. The resulting compositions form films which are hard, glossy and flexible, and which possess excellent mar resistance. These coating compositions can be applied by brushing, spraying, dipping or flow coating, and dry readily when baked at a temperature of about 250° F. to 350° F. for periods of approximately 30 minutes.

The component ordinarily utilized in a predominant amount in preparing the coating compositions of this invention is a water dispersible alkyd resin, in which water dispersibility is obtained by incorporating in said resin a polyalkylene glycol, and preferably a polyethylene glycol of the type known commercially at the "Carbowaxes." Alkyd resins of this type, as well as methods for their preparation, are disclosed in U. S. Patent No. 2,634,245. The method of the patent involves first preparing a conventional alkyd resin, such resins being readily obtainable as commercial products. Useful alkyd resins can be prepared, for example, by heating an acid or anhydride such as phthalic anhydride with glycerol, together with a drying oil derivative modified by ester interchange with glycerol in order to form the monoglycerides or diglycerides of fatty acids. In some instances, "oil modification" is effected by first reacting the free fatty acids of a glyceride oil, ordinarily a drying oil, with glycerol to form mono- or diglycerides or mixtures thereof. These partial esters may then be incorporated with phthalic acid and glycerol (if required) and the mixture can be heated to form a polyester. The oil modified resins can also be obtained by incorporation of the fatty acids and glycerine with phthalic acid and heating the mixture to reaction temperature. Normally, the polyesters will contain 30 percent to 70 percent and preferably 45 percent to 75 percent by weight or slightly more or less of the glyceride oil or its equivalent of mono- or diglyceride. Such resins are ordinarily spoken of as being 30 percent to 70 percent or 45 percent to 70 percent oil modified. The total glycerol component of the mixture normally should be in approximate molecular equivalency of the carboxyls of the acid or anhydride and the fatty acids of the drying oil. In some instances glycerol may be partially or completely replaced by pentaerythritol or similar materials.

Preferably, the alkyd resin components are heated until water is evolved by condensation reaction and is separated from the reaction zone. The reaction is continued until fairly high viscosities are obtained; for example, a Gardner-Holdt viscosity of about W to Z should be obtained when a sample of the resin is diluted with 50 percent by weight of naphtha. In any event, heating should not be continued so long as to form an insoluble, infusible product.

The polyalkylene glycol component which is employed as a modifier of the alkyd resin base to obtain water dispersibility properties preferably is a condensation product of ethylene glycol of relatively high average molecular weight and usually includes a plurality of ether linkages. The average molecular weight will ordinarily be above 300 and may be as high as 1500 or 2000. Best results have been obtained by the use of polyethylene glycols having molecular weights within a range of 300 to about 1500, although it is to be understood that mixtures of polyethylene glycols having molecular weights as high as 2000 or as low as 200 may also be utilized. In addition to polyethylene glycols, other polyalkylene glycols, such as polypropylene glycol and the like, may also be utilized.

The proportion of the alkyd resin base and the polyalkylene glycol utilized in preparing water dispersible alkyd resins can be varied widely. Good results are obtained when the polyalkylene glycol is utilized in an amount of about 15 percent to 25 percent by weight of the combination of alkyd resin and polyalkylene glycol. Higher and lower proportions, for example, as low as 10 percent by weight or lower to as high as 30 percent by weight or higher can be used successfully. In preparing the water dispersible polyalkylene glycol modified alkyds, it is desirable that the alkyd resin be preliminarily heated to a temperature which usually will be about 200° C., and in most instances below 300° C. Good results have been obtained by preliminarily heating the mixture to 220° C. or 235° C. The polyalkylene glycol is also preferably heated to a temperature within the foregoing range and is then added to the preheated alkyd resin base. The mixture should be maintained at the foregoing temperature until the polyalkylene glycol goes into solution. It is believed that esterification between residual free carboxyls and the hydroxyls of the polyalkylene glycol occurs. As the heating operation is continued, it will be found that in many cases the viscosity of the solution will tend to fall. Heating should be continued until the minimum viscosity, as determined on small samples of the reaction product, is reached and the viscosity begins to rise. Obviously, heating should be discontinued before the tendency of the mixture to gel becomes pronounced. The attainment of a satisfactory degree of reaction between the alkyd resin and the polyalkylene glycol may be determined by conducting tests of the dispersibility of the alkyd resins in water upon small samples drawn off from time to time from the reaction mixture. The reaction product, if properly made, should be readily dispersible by mere agitation in hard or soft water without the addition of dispersing agents such as casein or soaps, although it is sometimes desirable to add a small quantity of a lower alkanol such as ethanol or the like to aid in dispersing the alkyd resin. The resulting emulsion should be of the oil-in-water type, that is, the water should constitute the continuous phase.

A second component utilized in preparing the coating compositions of this invention is a water-soluble resin obtained by the condensation of an aldehyde, particularly formaldehyde, with a triazine possessing the basic structure

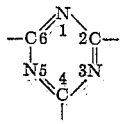

wherein at least one of the free valencies is substituted by an amine group. The preferred triazine-aldehyde resin is one prepared by the condensation of melamine with formaldehyde. Melamine is the simplest triazine and possesses the structure

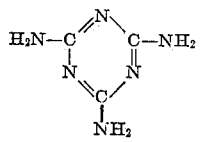

Water soluble melamine-formaldehyde resins are readily obtained, for example, by the method of U. S. Patent 2,529,856, which involves reacting a lower alkanol with a polymethylol melamine in the presence of an acid for such length of time as is necessary to obtain a clear solution and also for such length of time as is necessary to obtain reaction of the alkanol with the polymethylol melamine, then neutralizing said solution or making it slightly alkaline, and concentrating it by distillation under high vacuum until the concentration of resin solids is at least about 80 percent. If a solid dry resin is desired the distillation is continued until a substantially anhydrous, viscous syrup is obtained. This syrup, upon cooling, forms a clear, water-white, resinous solid which is infinitely miscible with water, particularly at room temperature.

A similarly useful water soluble melamine-formaldehyde resin can also be obtained by heating a mixture of formaldehyde and melamine to a temperature of about 160° F., and adding to said mixture a solution of an acidic catalyst such as oxalic acid in methanol or other lower alcohol. The resulting reaction product is then distilled at reduced pressure to a solids content of about 75 percent. This product is readily soluble in water.

In addition to melamine, other amino triazines or their derivatives, for example, 2-chloro-4,6-diamino-1,3,5-triazine, 2-phenyl-4-amino-6-hydroxy-1,3,5-triazine, 6-methyl-2,4-diamino-1,3,5-triazine, and the like may also be utilized to prepare water soluble triazine-aldehyde resins for use in preparing water dispersed coating compositions.

The respective quantities of polyalkylene glycol modified alkyd resin and triazine-aldehyde resin employed may be varied substantially without greatly affecting the film forming properties of the coating compositions. However, best film forming properties are obtained when the alkyd resin is present in an amount of about 75 percent to 85 percent, and the triazine-aldehyde resin is present in an amount of about 15 percent to 25 percent, these percentages being based upon the total non-volatile weight of the two resinous components. Other quantities of the two resinous components may also be utilized; for example, the percentage of the triazine-aldehyde resin can be increased to as high as 50 percent or higher, although the films prepared from the resulting compositions tend to be considerably harder and less flexible. On the other hand, when the percentage of the polyalkylene glycol modified alkyd resin is increased substantially above 85 percent, the films become softer and more flexible. Soft flexible films and the very hard, brittle films are useful for many applications.

The resinous components described hereinabove can be brought together in a number of different ways to obtain the water dispersed coating compositions of the present invention. One simple and preferred method involves admixing the alkyd resin and the triazine-aldehyde resin and adding sufficient water to give a solids content of about 50 percent. The water utilized can be either tap water or distilled water. The resulting mixture is then stirred and a basic material, such as ammonia, diethylamine, dipropylamine, morpholine, tertiary butylamine, ethanolamine, diethanolamine, triethanolamine, or the like (the volatile amines being preferred) added to adjust the pH to about 8.0 to 10.0. It is sometimes desirable at this point to add a relatively small quantity of ethanol or other lower alkanol, or a ketone, such as methyl ethyl ketone, to the mixture to assist solvation and to give a clear solution. This is not a critical expedient, however, and may be dispensed with if a slight film haze is not objectionable. In the final step the color pigment, fillers, and other additives, if any, are added and the mixture stirred for about 5 to 10 minutes to assure good dispersion. The coating composition thus prepared is ready for use without further modification.

Materials which may be added to modify the coating compositions to obtain desired properties include thickening agents such as polyvinylpyrrolidone, casein, carboxymethyl cellulose, natural gums and the like; driers such as cobalt naphthenate or lead naphthenate; catalysts to assist curing of the triazine-aldehyde resin, for example, the morpholine salt of para-toluenesulfonic acid and the like; and surface active agents such as an alkyl phenol-polyethylene oxide condensate, which serve to modify the surface tension of the coating composition. As will be seen from the specific examples, color pigments can also be added; it is preferred that the pigment be one which does not substantially affect the pH of the coating composition. If desired, other resinous materials such as phenol-aldehyde resins, natural occurring resins, and the like may be added, preferably in minor quantities.

While the above described method of formulating the coating composition is preferred, other methods may also be used with good results; likewise, other modifying agents may also be employed.

As indicated hereinabove, it is preferred for reasons of stability that the coating composition have a pH within the range of about 8.0 to about 10.0. It has been found that the pH tends to drop slowly on standing, this probably being due to the fact that some bacterial growth takes place in the aqueous medium. Some of the bacteria tend to be acid forming, and therefore obviously lower the pH of the composition. It is accordingly desirable to include in the coating composition a bactericide; materials which can be used for this purpose include the sodium salts of o-phenylphenol, pentachlorophenol, dichlorophenol, butenylphenols, pine oils, or the like. Only very small amounts of the bactericide are necessary, for example, about 0.25 percent to 1.0 percent based upon the total weight of the coating composition being sufficient ordinarily, although larger quantities may be utilized if desired.

The following examples illustrate in detail the preparation of a water dispersible polyalkylene glycol modified alkyd resin, a water soluble melamine-formaldehyde resin, and the use of such resins in the preparation of water dispersed coating compositions, and more specifically, water based baking enamels. The examples are not intended to limit the invention, however, for there are, of course, numerous possible variations and modifications.

Example 1

An alkyd resin was prepared utilizing the following components in the amounts set forth:

| | Parts by weight |
|---|---|
| Soybean oil | 1040 |
| Tung oil | 520 |
| Glycerine | 525 |
| Litharge | 0.9 |
| Phthalic anhydride | 1130 |
| Xylene | 166 |

The above components were reacted in a large stainless steel reactor (equipped with a reflux condenser) under an inert atmosphere, and at a temperature of about 400° F. to 450° F. Reaction was continued until a resin having a body of $Z_3$ (when measured on a small sample having a concentration of 50 percent by weight in petroleum naphtha, B. P. 310° F. to 410° F.) was obtained.

In order to impart water dispersibility to this alkyd resin, it was brought to a temperature of 220° C. and 809 parts by weight of a mixture of polyethylene glycol, which was a combination of equal parts of a polyethylene glycol of an average molecular weight of 1450 and a polyethylene glycol of an average molecular weight of 300, similarly heated, was added. The temperature was maintained for 80 minutes with agitation. At the conclusion of this period the mixture was cooled as rapidly as possible.

The resulting product could be readily dispersed by agitation in water at a temperature of about 100° C. or below. The resulting dispersions were of the oil-in-water type, that is, the water constituted the continuous phase. The dispersions were stable and suitable for use as film-forming materials. Water dispersible resins are also obtained when polypropylene glycol is substituted for the polyethylene glycol.

Example II

Fifteen and six-tenths pounds of linseed oil and 3.9 pounds of glycerine were placed in a reactor and covered with a blanket of inert gas. The mixture was heated to a temperature of 375° F. and 4.1 grams of litharge added. The temperature was then raised to 445° F. and held until the alcoholysis was complete (approximately one hour). To the reaction product were added 11.3 pounds of phthalic anhydride, 1.35 pounds of glycerine and 2.0 pounds of xylene. The resulting mixture was then refluxed at 425° F. until an acid number of 20 was obtained. Seven and seven-tenths pounds of a polyethylene glycol having a molecular weight of about 600 was then added and the reaction mixture heated to 428° F. until an acid number below 15 was obtained (approximately 3 hours). The resulting product was a water dispersible alkyd resin obtained in a yield of 95.7 percent. The resin had an acid value of 14.1, a Gardner-Holdt color of 10, a weight per gallon of 9.26 pounds, a total solids of 98.3 percent and a Gardner-Holdt viscosity of 5 minutes.

Example III

Twenty-five pounds of tall oil and 1.65 pounds of maleic anhydride were heated to 155° C. for 2 hours. To the resulting reaction mixture, 227 grams of phthalic anhydride, 4.35 pounds of pentaerythritol and 2 pounds of xylene were added. The entire reaction mixture was then heated to 275° C. and refluxed until an acid number of 33 was obtained. At this point 7.5 pounds of polyethylene glycol (Carbowax 1500) was added and the mixture reheated to 275° C. and refluxed until an acid number of 15 was obtained. Inert gas was then passed into the reaction mixture until an acid number of 12 was reached, after which the composition was dropped to a thinning tank and 8.2 pounds of ethanol added. The alkyd gave the following analysis:

| | |
|---|---|
| Acid number | 18.3 |
| Weight per gallon pounds | 8.43 |
| Percent solids | 84.7 |
| Gardner-Holdt viscosity | Z— |
| Gardner-Holdt color | 15 |

Example IV

Thirteen and one-tenth pounds of 37 percent formalin solution (adjusted to a pH of 7.5) and 6.8 pounds of melamine were heated to a temperature of 160° F. When the resulting solution was clear 15.6 grams of oxalic acid and 32.4 pounds of methanol were added through a sparger line, and the resulting mixture refluxed for 15 minutes at a temperature of 160° F. The reaction mixture was then cooled to 120° F. and the pH adjusted to 9.0. The resulting material was filtered and the methanol stripped off under vacuum at temperatures below 50° C. until a total solids of 75 percent was obtained. The final material had the following analysis:

| | |
|---|---|
| pH | 8.5 |
| Percent total solids | 67.7 |
| Gardner-Holdt viscosity | D |
| Gardner-Holdt color | 1–2 |

Example V

Seventy-eight parts by weight of a polyethylene glycol modified alkyd resin (prepared according to the method of Example II) and 22 parts of a melamine-formaldehyde resin (prepared according to the method of Example IV) were admixed and water added to give a solids content of about 50 percent. Morpholine was then added in an amount to give a pH of from 8.0 to 8.5. Twenty-five parts of ethanol was then added to give a clear solution having a solids content of 40 percent. The resulting composition was stirred for five minutes and films thereof were drawn down on steel panels and allowed to air dry for about 30 minutes, after which they were baked at 300° F. to 350° F. for an additional 30 minutes. After cooling to room temperature, the films were clear, glossy, hard and flexible.

Example VI

A clear enamel was prepared according to the following formulation:

| | |
|---|---|
| Melamine-formaldehyde resin (prepared according to Example IV) | 27.5 grams. |
| Tall oil alkyd (prepared according to Example III) | 97.5 grams (80 percent solution in ethanol). |
| Water | 75 grams. |
| Morpholine | 7 grams. |

The composition had a pH of 9.2. Films of the enamel baked at 300° F. on metal were clear, had a Sward hardness of 12, and an impact of 50 inch pounds.

To a sample of an enamel prepared according to the above formulation 5 percent by weight of black pigment and 5.1 percent by weight of polyvinyl pyrrolidone were added. The resulting composition was useful as a dipping enamel and gave films of good hardness and impact resistance. The water resistance of the baked films was also good.

When a white pigment such as titanium dioxide, was substituted for the black pigment in this example, generally equivalent results were obtained.

Example VII

The compositions of the present invention are useful also as binder resins for fiber glass preforms. This utility is illustrated as follows:

An alkyd resin was prepared from the following components:

| | | |
|---|---|---|
| Diethylene glycol | pounds | 689 |
| Maleic anhydride | do | 637 |
| Polyethylene glycol (Carbowax 1540-W) | do | 289 |
| Triphenyl phosphite | do | 8 |
| Diallyl phthalate | do | 635 |
| Tertiary butyl catechol | do | 135 |
| Xylene | gallons | 11 |

The alkyd was prepared by heating a mixture of the diethylene glycol, maleic anhydride, polyethylene glycol, and xylene at a temperature in the range of about 300° C. to 385° C. until an acid number of about 30 was obtained. The diallyl phthalate and the tertiary butyl catechol were then added.

The binder composition was then prepared utilizing 0.25 pound of the alkyd, 0.25 pound of a water soluble melamine-formaldehyde resin prepared according to Example IV, and 4.5 pounds of water. This composition had an initial pH of 5.0 which was adjusted to 9.0 by the addition of ammonium hydroxide. The composition had a stability of more than 24 hours. One and one-tenth pounds of the resin was utilized in preparing a fiber glass preform in the shape of a waste paper basket. One and thirty-five hundredths pounds of a polyester resin known commercially as Selectron 5003L, and 2 percent by weight of a 1:1 mixture of benzoyl peroxide and tricresyl phosphate, added as a polymerization catalyst, were sprayed onto the preform. The preform molding was placed in a mold and heated at 240° F. for 3 minutes under 50 tons' pressure. The molding was then removed and found to have excellent color and showed no washing, that is, the glass fibers did not move appreciably during the molding process.

The water dispersed coating compositions obtained by the method described hereinabove are particularly useful for application by spraying, brushing, dipping or flow coating to metal surfaces because of their excellent adhesion to such surfaces and their good flexibility and impact resistance. Accordingly, they can be used effectively as finishes for toys, appliances, furniture and similar objects. The coating compositions can also be applied to other materials which can withstand the 300° F. to 350° F. temperature required to obtain a dry, hard, glossy film in a period of about 30 minutes.

From the foregoing description, it will be apparent that the coating compositions of the present invention constitute a new and useful group of materials. It will also be apparent to those skilled in the art that numerous variations and modifications can be made in the compositions described herein without departing from the spirit and scope of the invention as defined in the appended claims.

We claim:

1. An oil-free, water-dispersed coating composition containing as the sole resinous components thereof from 75 percent to 85 percent by weight of a reaction product of a glyceride oil fatty acid and an alkyd esterification product of a polycarboxylic acid selected from the group consisting of a phthalic acid, phthalic anhydride, maleic acid and maleic anhydride, and a polyhydric alcohol containing at least three hydroxy groups, said alkyd esterification product being further modified with a polyalkylene glycol and from 15 percent to 25 percent by weight of a water-soluble lower alkanol-modified melamine-aldehyde resin, said percentages being based upon total non-volatile weights, and as the sole dispersing medium, water.

2. The water-dispersed coating composition of claim 1 wherein the polyalkylene glycol is polyethylene glycol.

3. The water-dispersed coating composition of claim 1 wherein the pH thereof is maintained at about 8.0 to 10.0.

4. The water-dispersed coating composition of claim 3 wherein the pH thereof is maintained within said range of about 8.0 to 10.0 by including an amine in said composition.

5. A method of preparing an oil-free, water-dispersed coating composition containing as the sole resinous components thereof a reaction product of a glyceride oil fatty acid and an alkyd esterification product of a polycarboxylic acid selected from the group consisting of a phthalic acid, phthalic anhydride, maleic acid and maleic anhydride, and polyhydric alcohol containing at least three hydroxy groups, said alkyd esterification product being further modified with a polyalkylene glycol and a lower alkanol-modified melamine-aldehyde resin which comprises admixing from 75 percent to 85 percent by weight of said alkyd esterification product and from 15 percent to 25 percent by weight of said melamine-aldehyde resin, said percentages being based upon total non-volatile weights, in water as the sole dispersing medium, and adjusting the pH of said dispersion to about 8.0 to 10.0.

6. The method of claim 5 wherein the polyalkylene glycol is polyethylene glycol.

7. The method of claim 5 wherein the pH of said dispersion is adjusted to within the range of 8.0 to 10.0 by adding morpholine thereto.

References Cited in the file of this patent

UNITED STATES PATENTS

| | | |
|---|---|---|
| 2,471,396 | Light | May 24, 1949 |
| 2,596,938 | Nielsen et al. | May 13, 1952 |
| 2,601,661 | Kienle et al. | June 24, 1952 |